United States Patent [19]
Izumi

[11] 3,728,840
[45] Apr. 24, 1973

[54] APPARATUS FOR FILLING UP AND SEALING A SYNTHETIC RESIN TETRAHEDRON

[76] Inventor: Shinjiro Izumi, 18-7 Ryouke 1-chome, Urawa, Japan

[22] Filed: July 28, 1971

[21] Appl. No.: 166,809

[52] U.S. Cl. ............................... 53/29, 53/183
[51] Int. Cl. ...................................... B65b 43/08
[58] Field of Search ..................... 53/29, 37, 183; 93/35 PC, 35 PT

[56] References Cited

UNITED STATES PATENTS 3,347,363   10/1967   Dykes et al. ............... 93/35 PT
3,290,198   12/1966   Lux et al. ..................... 93/35 PT Primary Examiner—Travis S. McGehee
Assistant Examiner—John Sipos
Attorney—Toren and McGeady

[57] ABSTRACT

Apparatus and method for forming a container having no longitudinal seam by passing a flatly folded continuous length of tubular material comprising a pair of oppositely positioned longitudinal folds through means for compressing said folds together while a transverse heat seal is formed at an end of said tubular material perpendicularly to said folds. After the heat sealing operation, the folds are released and the cut edges will separate to form an open mouth into which substances to be stored may be placed. A cover is subsequently sealed to the cut edges to close the container.

10 Claims, 15 Drawing Figures

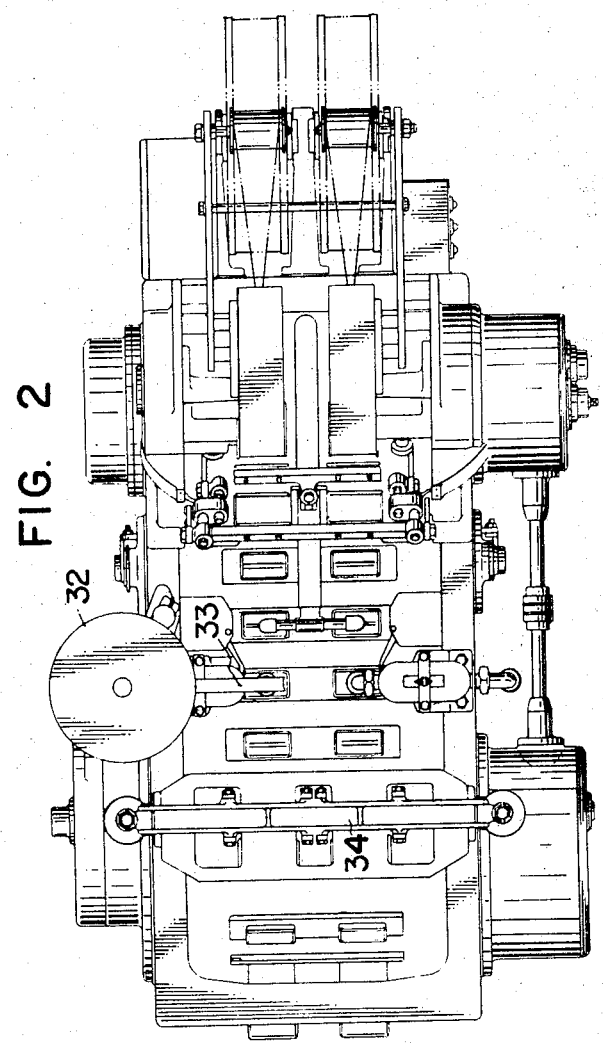

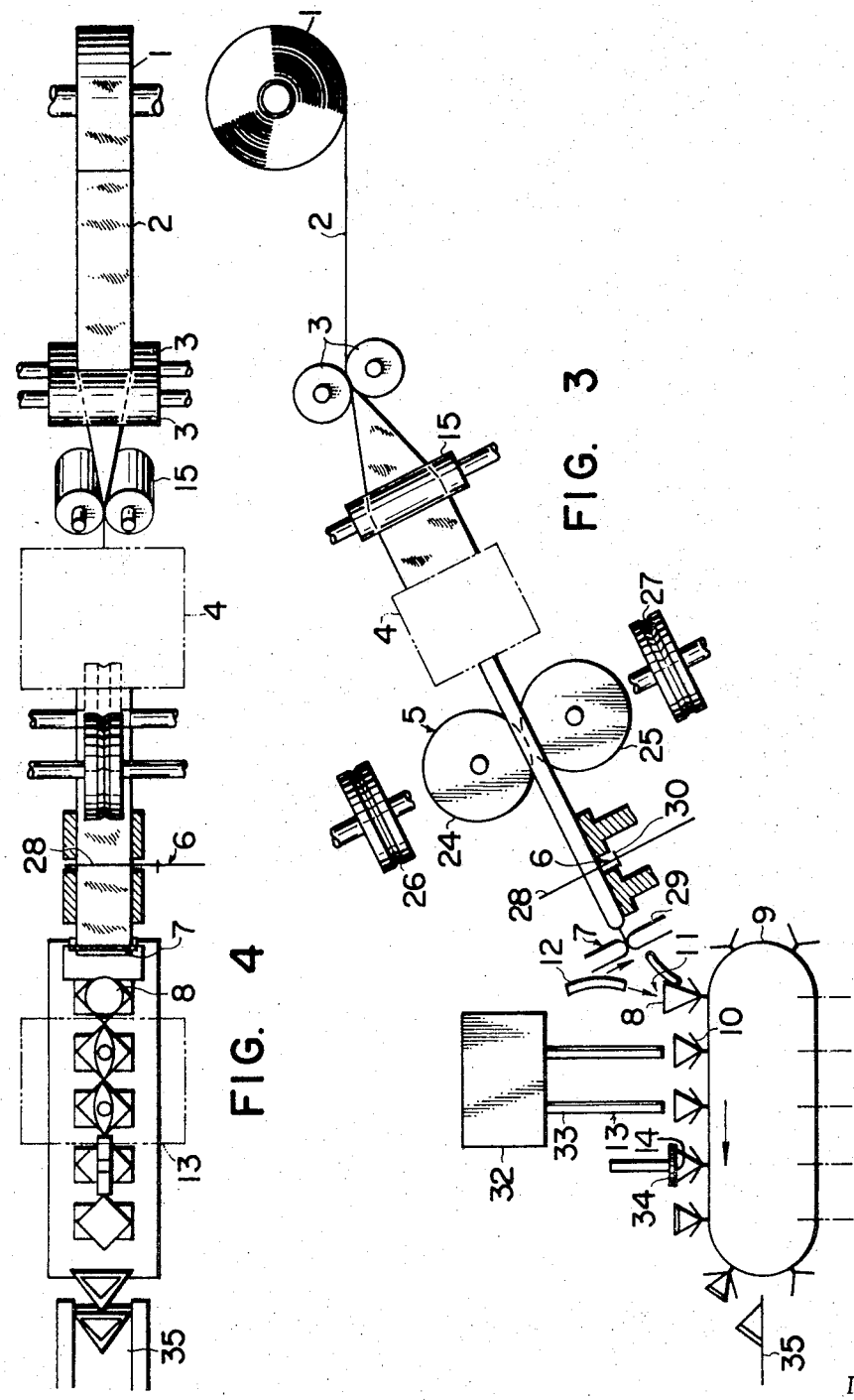

INVENTOR
Shinjiro Izumi
BY Toren and McHeady
ATTORNEYS

Patented April 24, 1973 3,728,840

INVENTOR
Shinjiro Izumi
BY Toren and McHeady
ATTORNEYS

APPARATUS FOR FILLING UP AND SEALING A SYNTHETIC RESIN TETRAHEDRON

It is already known to use a container of tetrahedron as the container for milk and other fluid or small solids (powdered goods or granulated goods). And in these cases, in the conventional container of tetrahedron consisting of paper or paper laminated with synthetic resin or paper coated with wax, it was necessary to form a seam in the longitudinal direction of a tube to make it. On this account, the manufacturing process is complicated and moreover there is a fear of leakage of the content from this seam and there is a risk that a heat seal at the opening seal edge is made imperfect.

The present invention aims at eliminating the defect of this conventional strong container and providing a container which is easy in manufacture and extremely excellent in seal.

The first special feature of the present invention made with such purpose resides in adopting a seamless flatly folded and wound tube as the material of tetrahedron thereby eliminating inconvenience due to the presence of the longitudinal seam on the conventional container.

The second special feature of the present invention resides in that the opening part of the subsequent tetrahedral constitutive unit was made possible keeping it widely opened without aid of the other means by utilizing the folds of said flately folded and wound tube, namely by changing the direction of the folds in such a manner that these folds may just be overlapped.

Another special feature of the present invention resides in that the folds of said wound tube are adapted to be guided in the state in which these folds are just overlapped by introducing the fold of said wound tube in the grooves circumferentially provided at the opposite places in the drawing of the rolls constituting a portion for pulling out the wound tube.

Furthermore, another special features of the present invention will be made clear below in the course of explanation of the present invention to be made with reference to appended drawings.

Referring to appended drawings,

FIG. 2 is a plan view of FIG. 1;

Figure 1:
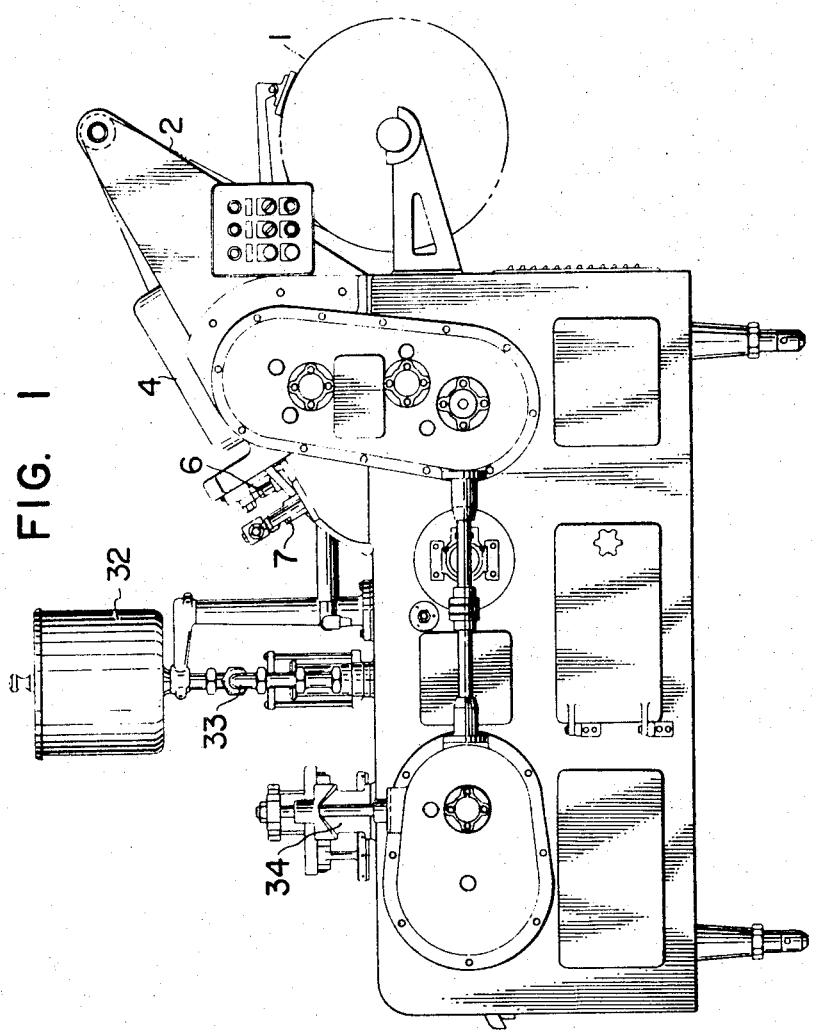
FIG. 1 is a substantial elevation of the apparatus showing an embodiment of the present invention.
Figure 5:
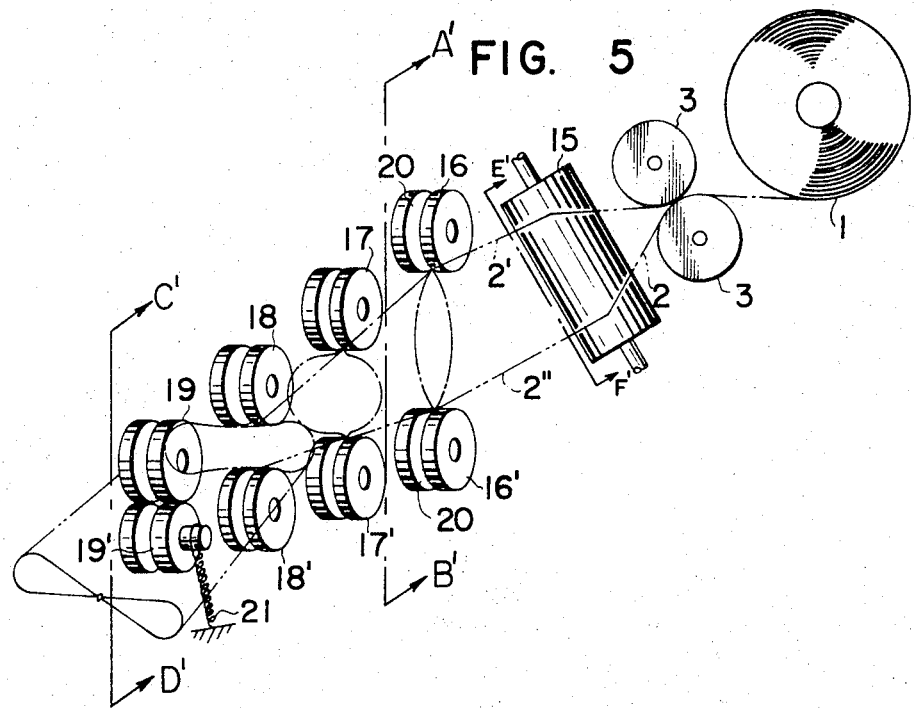
Figure 6:
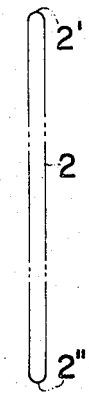
Figures 7, 8:
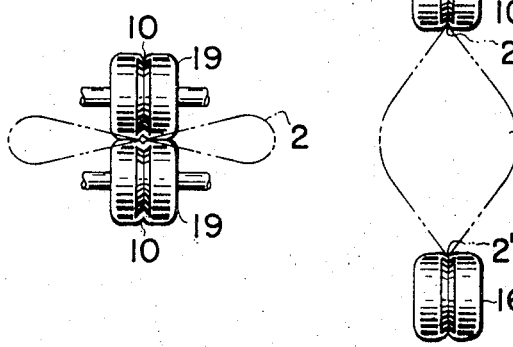
Figure 9:
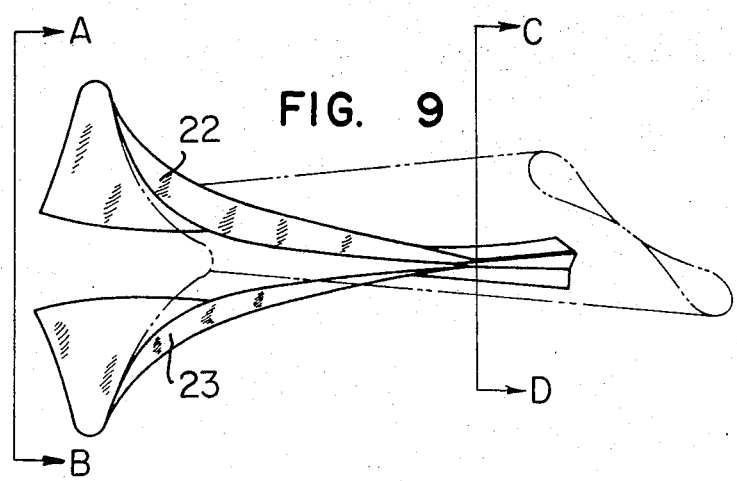
Figure 10:
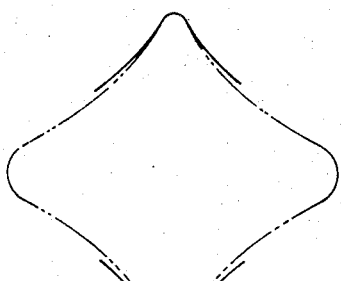
Figure 11:
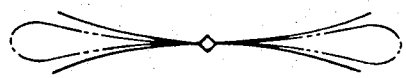
Figure 12:
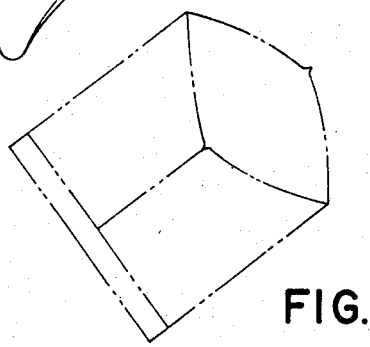
Figure 13:
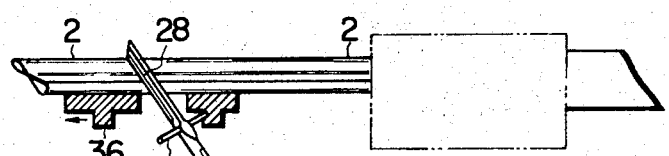
Figure 14:
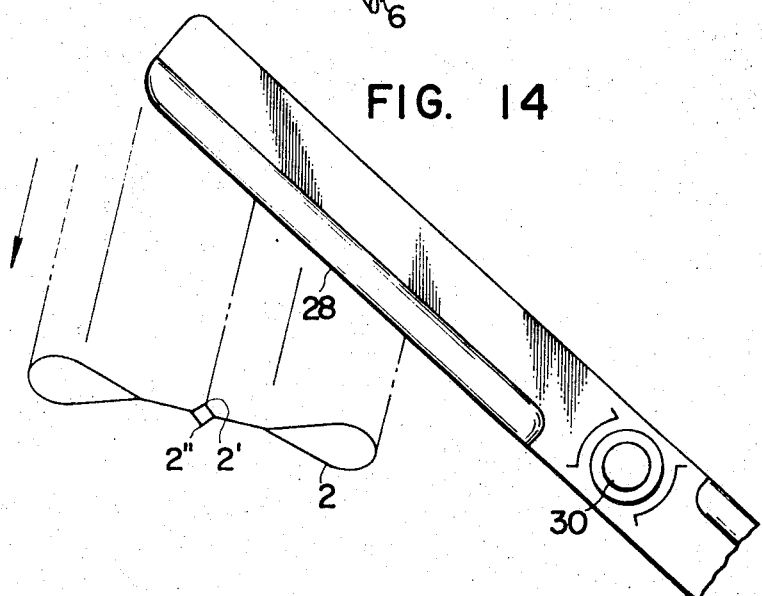
Figure 15:
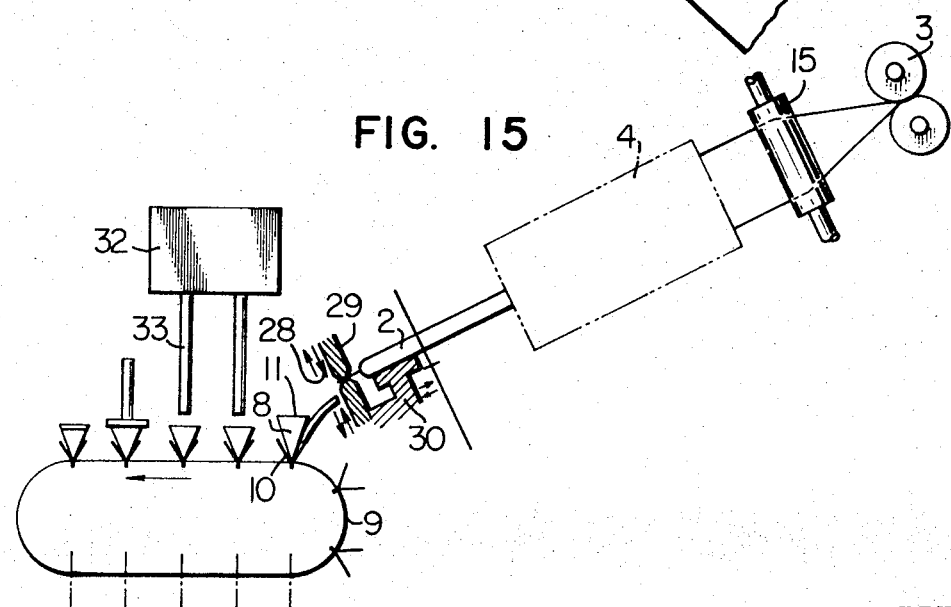

FIG. 3 and the following drawings are explanatory diagrams of the apparatus shown in FIGS. 1 and 2, of which FIG. 3 is an arrangement view of the whole;

FIG. 4 is a plan view of FIG. 3;

FIG. 5 is an explanatory diagram mainly of the creasing part;

FIGS. 6 to 8 are sectional views taken along the lines E'–F', A'–B', and C'–D' of FIG. 5 respectively;

FIG. 9 is an explanatory diagram showing the other embodiment of the creasing part;

FIGS. 10 and 11 are sectional views taken along the lines A–B and C–D of FIG. 9 respectively;

FIG. 12 is a perspective view of a tetrahedral constitutive unit shaped into a bag-like form;

FIG. 13 is a perspective view showing a constitution of the cutting blade;

FIG. 14 is a partial enlarged perspective view of the portion shown in FIG. 13; and FIG. 15 is an explanatory diagram of the apparatus including a modification of the pulling out part.

Firstly, in FIGS. 1 and 2, a take-up roll 1 and a synthetic resin made flatly folded and wound tube 2 (its section is shown in a sectional view of (a) part of FIG. 3) are introduced in a creasing means 4 through a guide roll 3 but the direction of the flatly folded and wound tube 2 is changed by 90° between the guide roll 3 and the creasing means 4 due to the fact that these members have their respective axes displaced by 90° as shown. As to the constitution of the creasing means 4, explanation will be made in detail later but the flatly folded and wound tube 2 fed out of the creasing means 4 passes through a cutting part 6 and a heat seal part 7 via a pulling out means 5 consisting of a pair of rollers and in the meantime the wound tube is shaped into a bag-like tetrahedral constitutive unit 8 and the constitutive unit 8 is inserted in a bucket 10 of a bucket conveyor 9 in the state that an opening edge 11 of the unit 8 is positioned at the upper side. And while each tetrahedral constitutive unit 8 is fed with the movement of the bucket conveyor 9, firstly a hot wind for sterilization is sprayed into the tetrahedral constitutive unit 8 through a hot wind pipe 12 and then at a filling part 13 the matters such as fluid or small solids is taken in each tetrahedral constitutive unit 8 and finally at a sealing part 14 the opening edge 11 of each constitutive unit 8 is heat sealed and thus a tetrahedron is formed.

Next, as to each part of the apparatus of the above constitution, explanation will be made below referring to FIG. 3 and the following drawings:

Before the synthetic resin made flatly folded and wound tube 2 fed out of said take-up roll 1 passes through the guide roll 3 and enter the creasing means 4, the direction of the wound tube 2 is changed by 90°. In case its intermediate distance is relatively short, the wound tube may directly be introduced as shown in FIGS. 1 and 2 but in case this distance is relatively long, a guide roll 15 is desired to be provided in the middle as shown in FIGS. 3 and 4.

According to the embodiment shown in FIG. 5, in said creasing means 4, a few pairs of roller pair (these are indicated by 16, 16', 17, 17', 18, 18', 19, 19') consisting of each one pair of rollers with grooves are arranged at a suitable intervals in such a manner that the intervals of rollers of each pair are gradually brought near to each other and the folds 2', 2" of said flatly folded and wound tube 2 is introduced in a groove 20 circumferentially provided on the peripheral surface of these each roller whereby, with the advance of the wound tube 2, the flatly folded and wound tube 2 is gradually pressed and when the wound tube passes between the rollers 19, 19', it is perfectly flatly pressed and thus said folds 2' and 2" are mutually overlapped. Further, reference numeral 21 indicates a spring for keeping on elastically pressing the roller 19' against the roller 19.

In the other embodiment shown in FIG. 9, the creasing means 4 are formed by a pair of mountain-shaped sectional guide plates 22, 23 consisting of hard and slippery material and these guide plates 22, 23 are formed in such a manner that the mutual intervals and the height of those mountains may be gradually reduced, so that the folds 2', 2" of said flatly folded and wound tube 2 are gradually pressed while the folds 2', 2" are introduced in the inner surface of mountain of each guide plate 22, 23 and as in said embodiment, the flatly folded and wound tube 2 is deformed up to the state in which each fold 2', 2'' are just overlapped.

Thus the flatly folded and wound tube 2 on which the positions of the folds 2', 2'' were changed in the creasing means 4 is pulled out by the pulling out means 5 formed by a pair of rollers 24, 25 and therefore in this case grooves 26, 27 are hollowed out on these rollers 24, 25 too circumferentially at those opposite places and the folds 2', 2'' of said flatly folded and wound tube 2 are guided by these grooves 26, 27, so that deviation to the right and left is prevented.

The flatly folded and wound tube 2 pulled out like this is then guided to the cutting part 6 and the heat seal part 7 and at these parts 6, 7 firstly a cutting blade 28 and a heat seal element 29 are provided and its working mode is that heat sealing takes place by the heat seal element 29 where the flatly folded and wound tube 2 was pulled out by a certain length by said pulling out means 5 and then the flatly folded and wound tube 2 is cut off with the cutting blade 28 at the place after a suitable distance from this seal part 7 but this cutting mode is that a pivot 30 of the cutting blade 28 is placed at the fairly lower position than that of the cutting plane of the wound tube 2 whose fold's position is moved by 90° as shown in FIGS. 13 and 14 and a microedge is attached as the edge of the cutting blade 28 itself too whereby a shear cutting takes place and by the adoption of such cutting method there is no inconvenience that the cut ends adhere to each other and its separation becomes difficult which were experienced in case a bag-like body of synthetic resin of this kind is cut off with usual scissors.

Next, the bag-like tetrahedral constitutive unit 8 cut off in a predetermined size by the above-mentioned method passes through a guide passage 31 and is inserted in the bucket 10 of the bucket conveyor 9 in the state that the opening edge 11 of the tetrahedral constitutive unit 8 is positioned at the upper side. On the bucket conveyor 9, hot wind for sterilization is sprayed into each tetrahedral constitutive unit 8 through the hot wind pipe 12 and then at the filling part 13 fluid or small solids stored in a tank 32 is filled in each tetrahedral constitutive unit 8 through a pipe 33 and further with the advance of the bucket conveyor 9, at the seal part 14 the opening part is heat sealed by a heat seal element 34 and thus a tetrahedron in which filling was completed is fed to a predetermined place by the transportation means such as a suitable conveyor 35 or the like. Since the inside of the container is sterilized by hot wind before the filling, there is an effect that sterilization of the container can perfectly take place.

Furthermore, it is possible that the heat seal part also concurrently serves for the work of the pulling out means 5 instead of said means 5 in said embodiment and it is shown in FIG. 15. In that drawing, a slide stand 36 to which the heat seal element 29 is fitted can be reciprocated in parallel with the feed direction of the flatly folded and wound tube 2 and the end of the flatly folded and wound tube 2 is pinched by the heat seal element 29 and the flatly folded and wound tube 2 is pulled out by the movement of the slide stand 36 during the course of heat sealing and the wound tube 2 is pulled out a predetermined distance, when cutting of the wound tube takes place with said cutting blade 28. In this case, since the fold of the flatly folded and wound tube 2 according to the present application is needless to say vertically formed, the opending edge 11 of the constitutive unit 8 is widely opened concurrently with the cutting and it is as in the previously mentioned embodiment that on the occasion of inserting the constitutive unit 8 in the bucket 10 of bucket conveyor 9 of the next stage, the aid of any special widely opening means is not obtained.

I claim:

1. Apparatus for making a container without a longitudinal seam comprising means for feeding into said apparatus a continuous length of tubular material folded in a first flattened configuration with a pair of oppositely positioned longitudinal folds formed along the length of said tubular material, means for compressing said folds together to form said tubular material into a second flattened configuration with the sides of said material extending generally in a direction perpendicular to the direction in which said sides extend when said material is in said first flattened configuration, means for forming a heat seal at an end of said tubular material in a direction extending transversely of said folds while said folds are held compressed, means for cutting said material along said transverse direction at a point longitudinally spaced from said heat seal, means for filling the cut end heat seal portion of said tubular material with a substance to be stored therein after said compressed folds have been released, and means for applying a cover onto said cut portion sealed along the cut edges thereof to form said container.

2. Apparatus according to claim 1, wherein said means for feeding said tubular material comprise a pair of power driven rollers between which said material is engaged, and a supply roll of said material wound in said first flattened configuration from which said power rolls draw said material.

3. Apparatus according to claim 1, wherein said means for compressing said folds together comprise at least one pair of rollers having circumferential grooves formed therein, said rollers being positioned on opposite sides of said material with said pair of longitudinal folds extending to within the grooves of said rollers.

4. Apparatus according to claim 3, wherein there is provided a plurality of pairs of said grooved rollers, with each pair being successfully spaced closer together than a preceding pair.

5. Apparatus according to claim 1, wherein said means for compressing said folds comprise a die member through which said tubular material is passed, said die member having a pair of opposed sides of curved configuration with said sides tapering together from a widely spaced apart end to a narrowly spaced end, said curved configuration being adapted to have said folds slide therein as said tubular material is passed through said die member from said widely spaced end to said closely spaced end.

6. Apparatus according to claim 1, wherein said means for filling include a conveyor having a plurality of movable bucket members into which said cut and heat sealed portions are placed with the cut edges thereof upwardly directed and spaced apart and in which said portions are held while said substance to be stored is placed therein.

7. Apparatus according to claim 6, wherein said means for applying said cover include means for sealing said cover to the cut edges of said cut and heat sealed portion while it is in one of said bucket members.

8. A method for making a container without a longitudinal seam comprising the steps of folding a continuous length of tubular material into a first flattened configuration with a pair of oppositely positioned longitudinal folds being formed along a length of said tubular material, compressing said folds together by forming said tubular material into a second flattened configuration with the sides of said material extending generally in a direction perpendicular to the direction in which said sides extended when in said first flattened configuration, forming a heat seal at an end of said tubular material in a direction extending transversely of said pair of longitudinal folds, cutting said material along said transverse direction at a point longitudinally spaced from said heat seal, releasing said compressed folds, filling the cut and heat sealed portion of said tubular material with a substance to be stored therein, and closing said cut portion by sealing a cover thereto along the cut edges thereof to form said container.

9. A method according to claim 8, wherein said continuous length of tubular material is fed in said first flattened configuration from a roll of such material.

10. A method according to claim 8, wherein the step of compressing said folds together is accomplished by passing said material between at least a pair of opposed rollers having grooves along the circumference thereof with said folds each positioned, respectively, in grooves of one of said opposed rollers.

* * * * *